United States Patent [19]

Haden, Jr. et al.

[11] 4,053,324

[45] Oct. 11, 1977

[54] PRODUCTION OF REDUCED CHARGE MONTMORILLONITE PIGMENT

[75] Inventors: Walter L. Haden, Jr., Westfield; Peter A. H. Isaac, Summit, both of N.J.

[73] Assignee: Engelhard Minerals & Chemicals Corporation, Edison, N.J.

[21] Appl. No.: 725,570

[22] Filed: Sept. 22, 1976

[51] Int. Cl.$^2$ .................................................. C09C 1/28
[52] U.S. Cl. .................................. 106/288 B; 106/72; 427/146; 428/331
[58] Field of Search .............. 106/288 B, 72; 427/146, 427/215; 428/331; 252/454

[56] References Cited

U.S. PATENT DOCUMENTS

| | | |
|---|---|---|
| 3,395,029 | 7/1968 | Bizzarri .................................. 106/72 |
| 3,622,364 | 11/1971 | Sugahara et al. ................. 106/288 B |
| 3,753,761 | 8/1973 | Sugahara et al. ................. 106/288 B |
| 3,915,731 | 10/1975 | Sugahara et al. ...................... 106/72 |
| 3,993,500 | 11/1976 | Isaac et al. ........................ 106/288 B |

*Primary Examiner*—Patrick P. Garvin
*Assistant Examiner*—J. V. Howard
*Attorney, Agent, or Firm*—Inez L. Moselle

[57] ABSTRACT

Preparation of so-called "reduced charge" montmorillonite or bentonite pigment from a naturally-occurring crude clay containing dioctahedral montmorillonite by ion-exchanging cations in the clay with hydrogen ions while the clay is in slurry form, filtering, pugging the filter cake with a preselected amount of a neutral or alkaline lithium salt, preferably the oxide, hydroxide or carbonate, and heat treating to collapse the mineral structure.

4 Claims, No Drawings

PRODUCTION OF REDUCED CHARGE MONTMORILLONITE PIGMENT

BACKGROUND OF THE INVENTION

1. Field of the Invention

This invention relates to improvements in the production of reactive electron-acceptor pigments useful in so-called "carbonless copying paper" systems in particular to improvements in the production of the reduced charge montmorillonite pigments useful as color formers in record material as disclosed and claimed U.S. Pat. No. 3,993,500. These pigments are obtained by replacing exchangeable cations of clays, a substantial proportion of which is dioctahedral montmorillonite, with a controlled amount of lithium ions, mildly heating the ion-exchanged montmorillonite to collapse irreversibly the montmorillonite structure and grinding to pigment-size particles. The teachings of said application are incorporated herein by reference thereto.

2. Prior Art

"Reduced charge montmorillonites," as described in the literature, embraces a series of montmorillonites of progressively lower charge, as determined by lattice expansion characteristics and quantity of exchangeable monobasic cations. Members of the series are obtained by exchanging exchangeable cations of dioctahedral montmorillonite with various amounts of lithium cations, followed by mild heat treatment to collapse the mineral lattice and fix the exchanged lithium cations (render lithium ions nonexchangeable). A rationale for the development of the unique properties of reduced-charge montmorillonites has been provided in the literature, specifically by G. W. Brindley and G. Ertem, CLAYS & CLAY MINERALS, 1971, Vol. 19, pages 300 to 404; G. Ertem, ibid, 1972, Vol. 20, pages 199 to 205; and R. Calvet and R. Prost, ibid, 1971, Vol. 19, pages 175 to 186.

Reduced charge montmorillonite has been produced by ion-exchanging cations in suitable montmorillonite clay with lithium ions derived from lithium chloride, washing the ion-exchanged clay to remove salts and heating the washed material. Use of lithium chloride or lithium salts of acids conventionally used to ion-exchange clays and the like is not practical in commercial production of a reduced charge montmorillonite pigment because of the difficulties involved in filtering the lithium-exchanged intermediate and washing the filtered solids to remove excess lithium salt. If not removed, the excess lithium salt would interfere with the pigmented coating composition. Thus, bentonite with calcium as the major exchangeable cation can be ion-exchanged with lithium chloride at clay solids of 30% or higher in some cases but the exchanged clay filters slowly using conventional filters such as vacuum filters. As soon as most of the salt has been removed from the filtered ion-exchanged clay by washing with water, it is extremely difficult to filter the wash water due to the removal of the strong electrolyte which permitted filtration, albeit slow, of the slurry of ion-exchanged clay. This technique for producing reduced charge montmorillonite pigment on a large commercial scale is obviously impractical. Aside from the expense involved or waste of lithium salts during ion-exchange, the low filtration rates would necessitate large capital investment in filtration equipment.

Accordingly, an objective of the invention is to provide a simple process for producing a reduced charge montmorillonite pigment whereby losses of the source of lithium ions are eliminated and filtration and washing are greatly facilitated.

THE INVENTION

Stated briefly, in accordance with this invention a clay material, a substantial amount of which is dioctahedral montmorillonite having its ion-exchange sites occupied substantially by alkali or alkaline earth metals, is formed into an aqueous slurry and a source of hydrogen ions is added thereto. The slurry is filtered and washed to remove free acid and soluble salts and the filter cake is pugged with a predetermined quantity of a neutral or alkaline lithium salt, preferably the oxide, hydroxide or carbonate. Without washing, the pugged material is heat treated under mild conditions to collapse the mineral structure and then ground to pigment-size particles.

DESCRIPTION OF PREFERRED EMBODIMENTS

The process is of especial benefit in the treatment of clays the exchangeable cations of which are predominantly sodium such as the Wyoming bentonites. The crude clay is preferably provided in pulverized form. Reference is made to U.S. Pat. No. 3,993,500 for details as to suitable starting clays.

Sufficient acid is added to the crude clay to form a slurry capable of being pumped. Solids should be as high as possible and are preferably 30% or above. Preferably the clay is added to water already containing acid. The anion of the acid is one that forms a soluble salt with exchangeable cations of the clay. Hydrochloric is preferred. Other acids are nitric, acetic, chloroacetic, formic and sulfuric. The latter acid is useful when processing sodium clays such as Wyomong bentonites but should not be used with calcium clays such as certain Texas bentonites because insoluble sulfate salts would be formed. Sufficient acid is employed to exchange substantially all the exchangeable cations in the clay. Generally, addition of acid to pH below about 4 will suffice. Leaching of aluminum of the clay should be avoided.

Exchange of hydrogens is very rapid, and as soon as it takes place, the liquid should be separated from the solids in the flocculated slurry. Filtration is preferred although centrifugation may be employed to effect the separation. The recovered solids should be thoroughly washed to remove free acid and soluble salts. Using filtration the solids of the washed cake is typically in the range of 40% to 50%, weight basis.

Preferably, the washed clay cake is charged to a pugger before incorporating a source of lithium ions in order to maintain the clay in flocculated state or condition whereby mixing can be carried out at high solids, preferably 40% by weight or higher. The lithium compounds that are used are those that are soluble in acid and may be neutral or basic. Preferred lithium compounds are the oxide, hydroxide and carbonate. Of these the carbonate is preferred because it is the cheapest. Examples of other soluble lithium compounds are the amide, formate, hydroxide, phosphate, sulfide and hydrosulfite.

The amount of lithium ions introduced to the clay may exceed the base exchange capacity, while at the same time the fraction of exchange sites occupied by lithium ions may be less than one; i.e., the clay may not be totally in the lithium-exchanged form. Generally, the base exchange capacity varies in proportion to the content of dioctahedral montmorillonite in the clay. Useful clay crudes generally have base exchange capacities in the range of 50 to 120 meq./100 g. (L.O.I.-free weight basis), most usually in the range of 70 to 110 meq./100 g. (L.O.I. or loss on ignition is determined by heating the pigment to essentially constant weight at 1800° F.). Test were carried out with crude clays containing 88% and 97% montmorillonite. It was found that optimum performance of the reduced charge montmorillonite was achieved in terms of pigment performance when lithium was exchanged to the extent of about 60 to 120 meq./100 g. based on the crude clays. Especially preferred in addition of lithium to about 100% (e.g., 90 to 115%) of the base exchange capacity of the clay. Generally, the $Li_2O$ analysis of pigments of the invention will be in the range of 0.5% to 4% by weight, expressed on a L.O.I.-free weight basis. Especially preferred are pigments containing from about 0.8% to 3% by weight $Li_2O$ on an L.O.I.-free weight basis.

Addition of the lithium compounds increase the pH of the clay mixture. Using the preferred lithium carbonate, the clay mixture will have a pH of a least 7, most usually in the range of 8 to 10.

The lithium exchanged clay material is discharged from the pugger, usually dried and then heated at a temperature high enough to collapse irreversibly the mineral structure by as low as possible to achieve this result. When temperature is too low, e.g., 125° C., the structure cannot be collapsed using reasonable durations of heating. On the other hand, when temperature is too high, e.g., appreciably above 300° C., the resulting pigment has undesirable coating properties and initial sensitivity and image fade resistance are adversely affected. Also, pigment brightness is undesirably decreased. A lower limit of temperature appears to be in the area of 160° C. when the duration of heating (after drying at room temperature) is 24 hours. An upper temperature is about 300° C. Recommended are temperatures in the range of about 200° C. to about 250° C. for about 30 minutes to 24 hours. Especially preferred are temperatures in the range of about 220° C. to 250° C. for 1 to 4 hours after drying.

Reduced charge montmorillonite, as synthesized, is in the form of chunk-like aggregates. It is essential to subject these aggregates to ultrafine grinding with optional classification before using the reduced charge montmorillonite in the production of record material. Preferably ultrafine grinding is carried out in a fluid energy mill since this type of mill operates with dry material and a dry pigment may be supplied to the user. However, other modes of grinding such as sand grinding and ball milling may be employed.

This example illustrates the production of a reduced charge montmorillonite pigment from an alkaline earth bentonite clay by the process of the invention. The starting clay had the following chemical analysis and properties.

| | Percent |
|---|---|
| Free moisture | 3.31 |
| Loss on ignition | 9.44 |
| L.O.I.-free basis: | |
| Total $SiO_2$ | 66.71 |
| Hydrated $SiO_2$ | 1.98 |
| Free $SiO_2$ | 7.06 |
| $Al_2O_3$ | 21.68 |
| MgO | 2.74 |
| $Fe_2O_3$ | 4.32 |
| $TiO_2$ | 0.27 |
| $CO_2$ | not found |
| CaO | 1.69 |
| $Na_2O$ | 1.07 |
| $K_2O$ | 0.78 |

-continued

| | Percent |
|---|---|
| Base exchange capacity | 81.7 meq./100 g. |
| Base exchange cations (as oxides): | |
| CaO | 1.45 |
| MgO | 0.39 |
| $Na_2O$ | 0.28 |
| $K_2O$ | 0.01 |

A sample of the clay was slurried at 30% solids in a solution of hydrochloric acid of 1.42% concentration. The resulting viscous but flowable slurry had a pH of 1.0. The slurry was mixed for ½ hour, filtered and washed with water to remove soluble salts. The damp filter cake at 47% solids was charged to a sigma-blade mixer. With the mixer in operation lithium carbonate was added in amount of 3.7% based on the dry weight of the clay, along with additional water to reduce clay solids to 37%. The mixture was pugged for about 40 minutes and discharged from the mixer. Without being washed, the pugged mixture was dried for 24 hours at room temperature and then calcined at about 220° C. for 24 hours. After calcination, the material was pulverized and ground in a fluid energy mill.

From this example it can be seen that a reduced charge pigment was produced with no loss of the source of lithium ions and with all steps of the processing being carried out at solids of 30% or above, thereby minimizing filtration and drying expenses.

We claim:

1. A method for producing a coating pigment useful as a sensitizer for record material from clay material, a substantial amount of which is dioctahedral montmorillonite having its ion-exchanged sites occupied by alkali metal or alkaline earth cations, which comprises forming said clay material into an aqueous slurry and incorporating therein a mineral acid the anion of which forms soluble salts with exchangeable cations in the clay, sufficient acid being used to exchange hydrogen ions for exchangeable cations in said clay, separating the clay thus ion-exchanged from the aqueous phase of the slurry by means of filtration or centrifugation, washing the remaining solids, pugging the solids with a preselected amount of a lithium salt to exchange lithium ions for hydrogen ions, without washing the pugged mixture, heating it mildly to collapse the structure of the dioctahedral montmorillonite, and grinding the material after heat treatment to produce pigment-sized particles.

2. The method of claim 1 wherein the lithium compound is lithium carbonate and sufficient of said compound is added to form a mixture having a pH above 7.

3. The method of claim 1 wherein said clay is a sodium bentonite.

4. A method for producing a coating pigment useful as a sensitizer for record material from clay material, a substantial amount of which is dioctahedral montmorillonite having its ion-exchanged sites occupied by alkali metal or alkaline earth cations, which comprises forming said clay into an aqueous slurry having a solids content of at least 30% and adding hydrochloric acid therein sufficient to exchange exchangeable cations therein with hydrogen ions, filtering the slurry and recovering and washing the filter cake to remove free acid and soluble salts, adding lithium carbonate to the washed cake in amount to provide from about 60 to 120 meq. lithium ions per 100 grams of clay and pugging the mixture at a solids content of at least about 40% and, without washing solubles therefrom, heating the mixture to collapse the dioctahedral structure, and grinding to pigment-size particles.

* * * * *